(12) United States Patent
Huang et al.

(10) Patent No.: US 11,660,659 B2
(45) Date of Patent: May 30, 2023

(54) FORGING PROCESS OF MAGNESIUM ALLOY WHEEL HUB

(71) Applicant: CITIC Dicastal Co., Ltd., Qinhuangdao (CN)

(72) Inventors: Lixin Huang, Qinhuangdao (CN); Zhihua Zhu, Qinhuangdao (CN); Liguang Xie, Qinhuangdao (CN); Hanqi Wu, Qinhuangdao (CN); Meng Li, Qinhuangdao (CN); Tieqiang Chen, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 0 days.

(21) Appl. No.: 17/576,257

(22) Filed: Jan. 14, 2022

(65) Prior Publication Data

US 2023/0071499 A1    Mar. 9, 2023

(30) Foreign Application Priority Data

Sep. 3, 2021   (CN) .......................... 202111031618.0

(51) Int. Cl.
  *B21K 1/40*   (2006.01)
  *B21J 1/06*   (2006.01)
  *B21J 5/00*   (2006.01)

(52) U.S. Cl.
  CPC ............... *B21K 1/40* (2013.01); *B21J 1/06* (2013.01); *B21J 5/008* (2013.01); *B60B 2310/208* (2013.01)

(58) Field of Classification Search
  CPC ........ B21K 1/40; B60B 2310/208; B21J 1/06; B21J 5/008
  See application file for complete search history.

(56) References Cited

U.S. PATENT DOCUMENTS

| | | | |
|---|---|---|---|
| 7,523,635 B2 * | 4/2009 | Ono ......................... | B60B 3/06 72/356 |
| 10,646,914 B2 * | 5/2020 | Nanninga ............... | C22C 21/06 |

FOREIGN PATENT DOCUMENTS

| | | | | |
|---|---|---|---|---|
| CN | 107900265 A | * | 4/2018 | |
| CN | 111974921 A | * | 11/2020 | ............... B21J 1/06 |

OTHER PUBLICATIONS

Machine Translation of CN 107900265 A (Year: 2018).*
Machine Translation of CN 111974921 A (Year: 2020).*

* cited by examiner

*Primary Examiner* — Christopher J Besler
(74) *Attorney, Agent, or Firm* — IPro, PLLC

(57) ABSTRACT

The disclosure discloses the forging process of a magnesium alloy wheel hub comprises the following steps: step 1, heating a magnesium alloy bar to 350-420° C. and keeping the temperature for 20 minutes; step 2, forging and forming the bar under a 6000-ton forging press, and controlling the forging process in sections. The forging process of the disclosure adopts sectional control, different forging process parameters are adopted in different forging stages, so that magnesium alloy bars can exert maximum forgeability in different deformation stages, make magnesium alloy deformation process more continuous, make forging process easier, obtain forged magnesium alloy wheel hub with excellent properties, and greatly improve forging process and processing efficiency.

3 Claims, 3 Drawing Sheets

FORGING PROCESS OF MAGNESIUM ALLOY WHEEL HUB

TECHNICAL FIELD

The disclosure relates to the technical field of wheels, in particular to a forging process of a magnesium alloy wheel hub.

BACKGROUND

Magnesium alloy is an alloy based on magnesium and other addition elements, with low density, high specific strength, large specific elastic modulus, good heat dissipation and shock elimination, the ability to bear impact load greater than that of aluminum alloy, and the corrosion resistance of organic matter and alkali, and is the lightest metal among practical metals with the specific gravity of magnesium being about ⅔ of that of aluminum and ¼ of that of iron, so it is widely used in automobile, aviation and aerospace fields, especially in automobile field. For example, parts made of magnesium alloy can make automobiles lightweight. Nowadays, for increasingly high demand of lightweight automobiles, the application of aluminum alloy has encountered a bottleneck in the weight reduction effect of automobiles, so the application of magnesium alloy in automobiles is imperative. In recent years, the automobile industry has developed rapidly and changed greatly. Many countries all over the world have introduced the deadline of banning the sale of fuel vehicles. The large-scale application of electric vehicles has brought opportunities for the development of magnesium alloy auto parts.

Magnesium alloy wheel hub has won the favor of more and more users because of its beautiful appearance, safety and comfort. Because of its light weight and high manufacturing precision, magnesium alloy wheel hub has small deformation and inertia resistance when rotating at high speed. Magnesium alloy wheel hub has the metal characteristics of absorbing vibration and rebound force. After machining by NC machine tools, it has high dimensional accuracy, high roundness, small yaw runout and good balance, which makes the automobile run smoothly and comfortably.

At present, the manufacturing method of magnesium alloy wheel hub usually adopts forging process. It is known that the properties of forging materials are closely related to forging process and sequence. Different forging processes and sequences will lead to obvious differences in performance in the same place. In the forging process of magnesium alloy, the selection of forging process and sequence will have an important impact on the properties of forged magnesium alloy wheel hub. Because of the face-centered cubic structure of magnesium alloy materials, magnesium alloy materials show poor forging properties. Using traditional forging technology, it needs a press with a tonnage of at least 8000 tons to forge corresponding products, and even if the corresponding products can be forged, they often show poor material properties.

SUMMARY

In view of this, the disclosure aims to provide a forging process of a magnesium alloy wheel hub to improve the forgeability of a magnesium alloy material, so as to obtain a magnesium alloy wheel hub with excellent mechanical properties.

In order to achieve the above purpose, the technical solution of the disclosure is realized as follows:

a forging process of a magnesium alloy wheel hub comprises the following steps: step 1, cutting a magnesium alloy bar with a diameter of 200 mm to 310 mm and a length of 220 to 350 mm, with an aspect ratio of 1.2 to 1.7; step 2, heating the magnesium alloy bar to 350-420° C. and keeping the temperature for 20 minutes; step 3, forging and forming the bar in sections under a forging press.

In some embodiments, the bar is pressed down from an initial length to ⅔ of the initial length of the bar, and the down-pressing speed is controlled at 12-15 mm/s; the bar is pressed down from ⅔ of the initial length to ⅓ of the initial length of the bar, and the down-pressing speed is controlled at 9-13 mm/s; the bar is pressed down from ⅓ of the initial length to the thickness of wheel hub forging stock, and the down-pressing speed is controlled at 6-10 mm/s.

In some embodiments, the forging press includes a 6000-ton forging press.

In some embodiments, the hub forging stock is machined to make a magnesium alloy wheel hub.

In some embodiments, the heating temperature of step 1 is 360° C.

The manufacturing method of the magnesium alloy wheel hub has the following advantages:

In the present disclosure, the magnesium alloy bar is heated to a preset temperature, so that the magnesium alloy bar is easier to deform and is not easy to occur forging cracks; the forging process adopts sectional control, different forging process parameters are adopted in different forging stages, so that magnesium alloy bars can exert maximum forgeability in different deformation stages to make magnesium alloy deformation process more continuous, and to make forging process easier, so as to obtain forged magnesium alloy wheel hub with excellent properties, there by greatly improving forging process and processing efficiency.

Moreover, the magnesium alloy wheel hub obtained by the above method still has excellent mechanical properties, which meet the requirements of American wheel standards SAE J175 and SAE J328-2005, namely, 13-degree impact strength, radial fatigue and bending fatigue performance, and can also meet the requirements of national standards GB/T 5334-2005 and GB/T 15704-1995 for wheel strength and fatigue.

BRIEF DESCRIPTION OF THE DRAWINGS

The accompanying drawings, which form a part of the disclosure, serve to provide a further understanding of the present disclosure, and the illustrative embodiments of the present disclosure and the description thereof serve to explain the present disclosure and are not unduly limiting. In the drawings.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A clear and complete description of the technical solutions of the present disclosure will be given below with reference to the accompanying drawings and in conjunction with embodiments which will be apparent to us that the embodiments are only part of and not all of the embodiments of the present disclosure. Based on the embodiments in the present disclosure, all other embodiments obtained by those of ordinary skill in the art without making creative efforts are within the scope of protection of the present disclosure.

A spinning process of a magnesium alloy wheel hub according to an embodiment of the present disclosure is described below with reference to FIGS. 1 to 5 and in conjunction with embodiments.

A forging process of a magnesium alloy wheel hub comprises the following steps:

Step 1, selecting the most suitable and economical bar length by calculating the material length and material ratio of each magnesium alloy wheel hub in advance, and cutting the magnesium alloy bar to meet the length required by the wheel hub manufacturing; in a heating furnace, heating the magnesium alloy bar to 350-420° C. and keeping the temperature for 20 minutes;

Step 2, forging and forming the bar under a 6000-ton forging press for one-time forming, and controlling the forging process in sections;

Step 3, in the forging and forming process, pressing down the bar from the initial length of the bar to ⅔ of the initial length of the bar, and controlling the down-pressing speed at 12-15 mm/s;

Step 4, in the forging and forming process, pressing down the bar from ⅔ of the initial length of the bar to ⅓ of the initial length of the bar, and controlling the down-pressing speed at 9-13 mm/s;

Step 5, in the forging and forming process, pressing down the bar from ⅓ of the initial length to the thickness of the wheel hub forging blank, and controlling the down-pressing speed at 6-10 mm/s.

Step 6, according to the magnesium alloy wheel hub drawings and design requirements, processing the magnesium alloy wheel hub to meet the requirements by a numerical control machining center machine tool.

Figure 3:
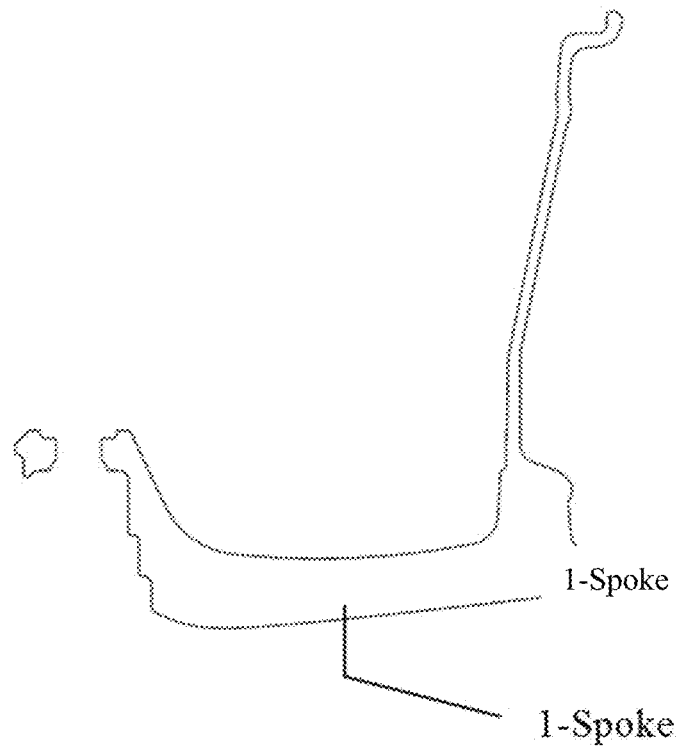
FIG. 3 is a sectional view of wheel hub of the manufacturing method of a magnesium alloy wheel hub according to the present disclosure.

The material properties of magnesium alloy wheel hub after processing are tested, and the material properties of forging materials, including tensile strength, yield strength, elongation and hardness, are tested by tensile testing machine and hardness tester;

As shown in FIG. 3, the spoke part has excellent microstructure and mechanical properties, with yield strength reaching 185 MPa, tensile strength reaching 280 MPa and elongation reaching 12%;

Embodiment 1

Figure 1:
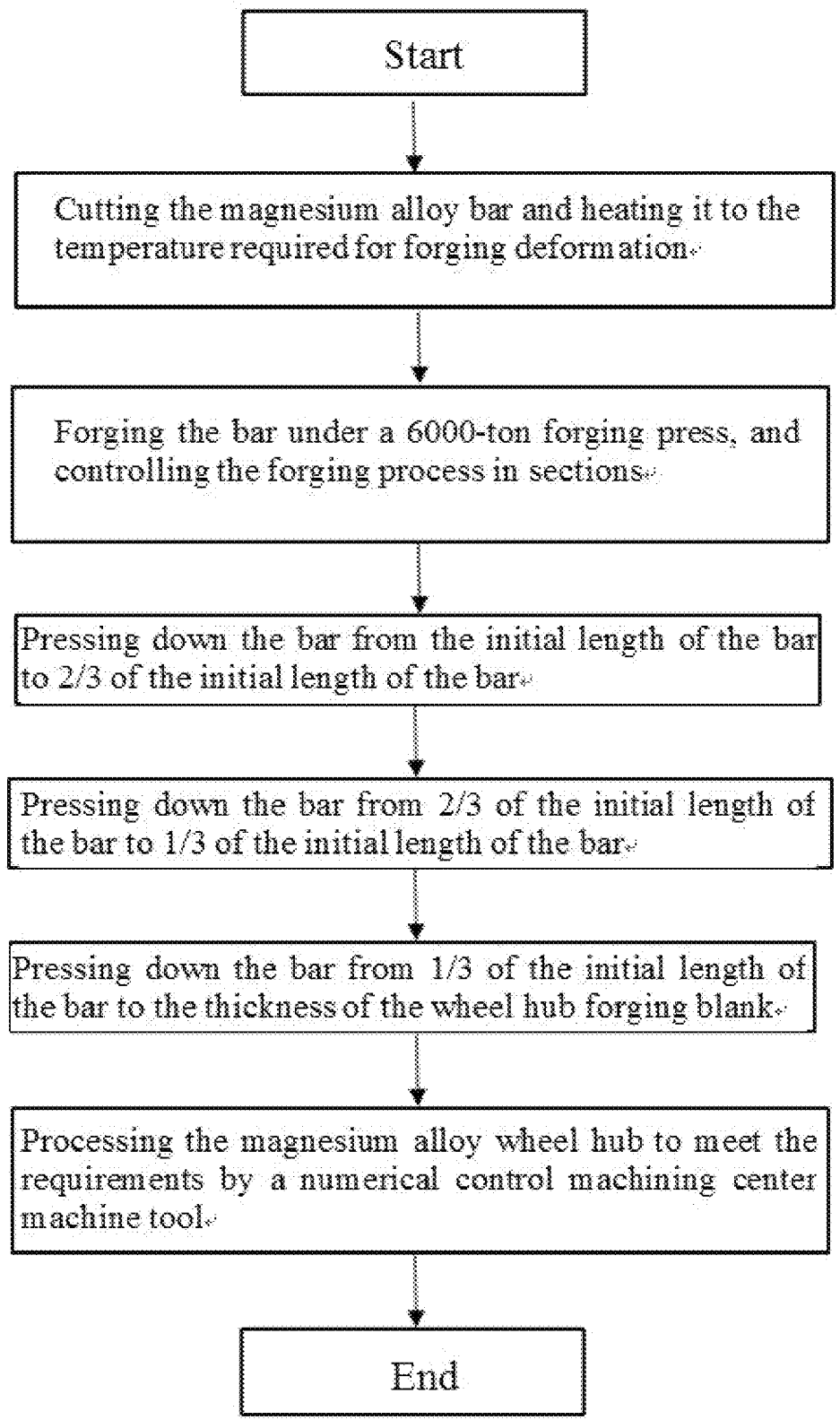
FIG. 1 is a flow chart of a manufacturing method of a magnesium alloy wheel hub according to the present disclosure.
Figure 2:
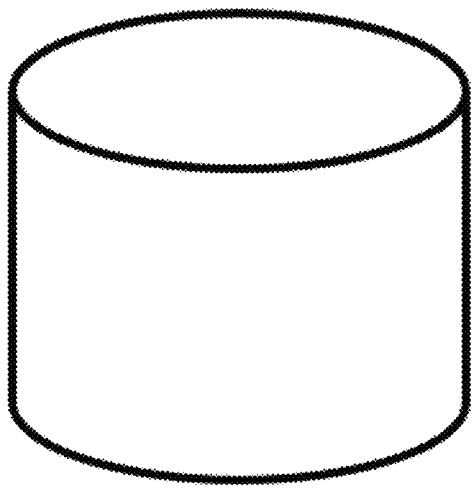
FIG. 2 is a schematic diagram of bar of the manufacturing method of a magnesium alloy wheel hub according to the present disclosure.

As shown in FIG. 1, the embodiment of the present disclosure provides a forging process for a magnesium alloy wheel hub, which comprise:

Step 1, cutting the magnesium alloy bar and heating it to the temperature required for forging deformation.

In the process of cutting the magnesium alloy bar, the most suitable and economical bar length is selected by calculating the material length and material ratio of each magnesium alloy wheel hub in advance, and the bar is cut by metal cutting machine; in heating the magnesium alloy bar to the temperature required for forging deformation process, the magnesium alloy bar is heated to a certain temperature in a heating furnace and kept the temperature for a period of time, wherein, the heating furnace can be an electromagnetic heating furnace and the like; the preset temperature is greater than or equal to 360° C., but it is not allowed to exceed 420° C.; 400° C. is the temperature for magnesium alloy easiest to deform and not easy to break, which ensures that there will be no cracking in the subsequent forging process.

Step 2, forging and forming the bar under a 6000-ton forging press, and controlling the forging process in sections;

Step 3, in the forging and forming process, pressing down the bar from the initial length of the bar to ⅔ of the initial length of the bar, and controlling the down-pressing speed at 12-15 mm/s. The purpose of this stage is to locate and ensure that the bar does not crack during forging process.

Step 4, in the forging and forming process, pressing down the bar from ⅔ of the initial length of the bar to ⅓ of the initial length of the bar, and controlling the pressing speed at 9-13 mm/s;

Step 5, in the forging and forming process, pressing down the bar from ⅓ of the initial length of the bar to the thickness of the wheel hub forging blank, and controlling the pressing speed at 6-10 mm/s.

Step 6, according to the magnesium alloy wheel hub drawings and design requirements, processing the magnesium alloy wheel hub to meet the requirements by a numerical control machining center machine tool.

Figure 4:
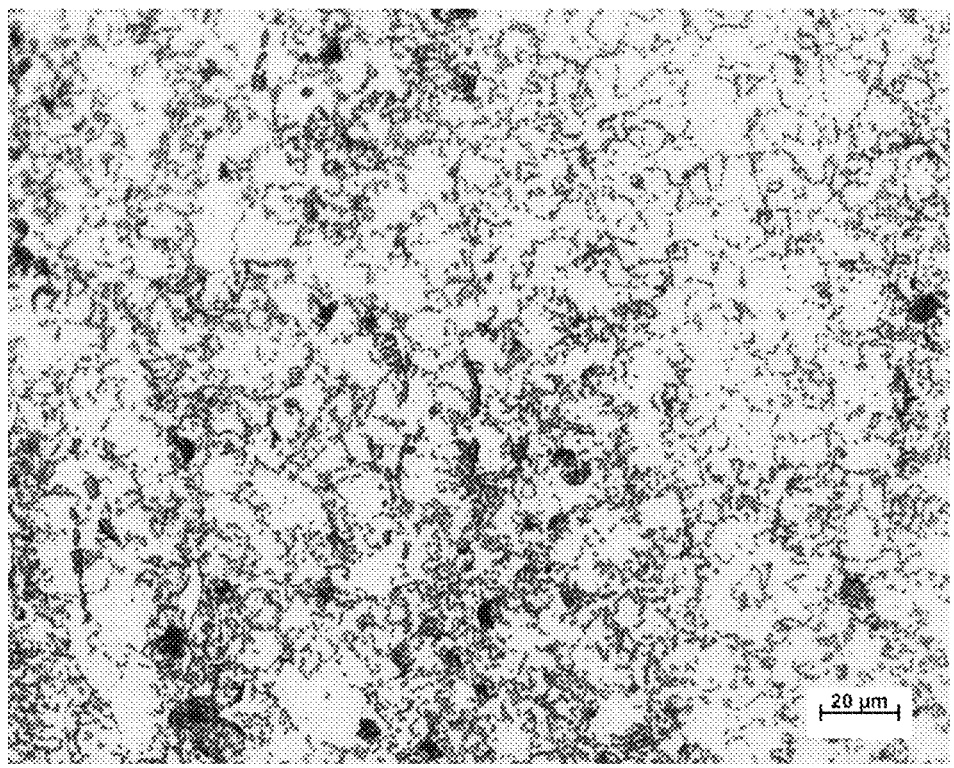
FIG. 4 is a 200-fold metallographic structure of the spoke part of the forging process of a magnesium alloy wheel hub of the present disclosure.
Figure 5:
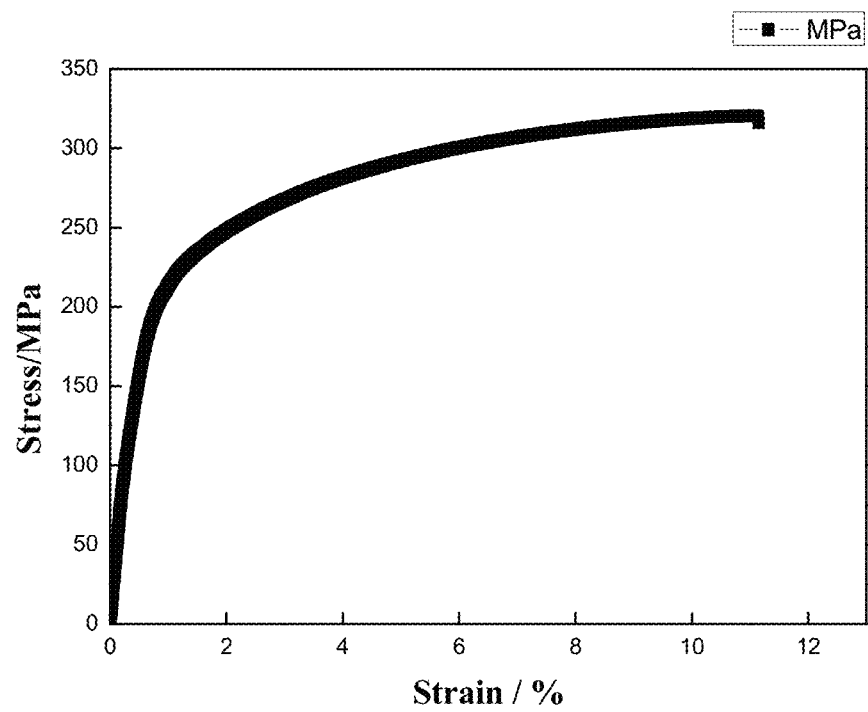
FIG. 5 is a material performance diagram of the spoke part of the forging process of a magnesium alloy wheel hub of the present disclosure.

As shown in FIG. 3, the spoke part has excellent microstructure and mechanical properties, with yield strength reaching 217 MPa, tensile strength reaching 321 MPa and elongation reaching 11.1%;

As shown in FIG. 4, it can be observed from the drawing that the grain size of the spoke is fine and uniform, showing a completely recrystallized structure, with a yield strength of 223 MPa, a tensile strength of 312 MPa and an elongation of 12%;

As shown in FIG. 5, the traditional forging process will crack when forging magnesium alloy wheel hub at a fixed speed. The reason is that the temperature will drop in the forging process. If the forging speed is constant, the edge strain rate of the bar is still high strain, which leads to low temperature and high strain in the forging process, and the edge position is easy to crack.

Various performance tests were carried out on the magnesium alloy motor vehicle wheel hub of embodiment 1. In the test center of CITIC Dicastal Co., Ltd., 13-degree impact strength, radial fatigue, bending fatigue and other wheel strength and fatigue tests were carried out on the above wheels. The test shows that the wheel hub meets the requirements of SAE J175 and SAE J328-2005 standards, i.e. 13-degree impact strength, radial fatigue and bending fatigue performance, and also meets the requirements of national standards GB/T 5334-2005 and GB/T 15704-1995 for wheel strength and fatigue performance.

The magnesium alloy wheel hub of traditional forging process and magnesium alloy wheel hub of new forging process, according to the requirements of the national standard, the 13-degree impact limit test was done until it cracked. The results showed that the impact limit performance of magnesium alloy wheel hub produced by traditional forging process was 780 Kg, and that of magnesium alloy wheel hub produced by new forging process was 850 Kg. The impact resistance of magnesium alloy wheel hub produced by new forging process was stronger. It can be inferred that if the same use requirements are met, the magnesium alloy wheel hub produced by the new forging process has more weight reduction space.

The manufacturing method of the magnesium alloy wheel hub has the following advantages:

In the present disclosure, the magnesium alloy bar is heated to a preset temperature, so that the magnesium alloy bar is easier to deform and is not easy to generate forging cracks; the forging process adopts sectional control, different forging process parameters are adopted in different forging stages, so that magnesium alloy bars can exert maximum forgeability in different deformation stages to make magnesium alloy deformation process more continuous, and to make forging process easier, so as to obtain forged magnesium alloy wheel hub with excellent properties, thereby greatly improving forging process and processing efficiency.

Moreover, the magnesium alloy wheel hub obtained by the above method still has excellent mechanical properties, which meet the requirements of American wheel standards SAE J175 and SAE J328-2005, namely, 13-degree impact strength, radial fatigue and bending fatigue performance, and can also meet the requirements of national standards GB/T 5334-2005 and GB/T 15704-1995 for wheel strength and fatigue.

| Preparation process | Radial fatigue | Bending fatigue (heavy load) | Bending fatigue (light load) | 13-degree impact |
|---|---|---|---|---|
| Traditional forging process | 2.8 million (limit) | 350,000 (limit) | 1.9 million (limit) | 780 kg (limit) |
| New forging process | 3.6 million (limit) | 500,000 (limit) | 6 million (limit) | 850 kg (limit) |

The above are only preferred embodiments of the present disclosure and are not intended to limit the present disclosure. Any modifications, equivalents, modifications, etc. made within the spirit and principles of the present disclosure should be included in the scope of protection of the present disclosure.

What is claimed is:

1. A forging process of a magnesium alloy wheel hub, wherein the forging process comprises the following steps:
    step 1, heating a magnesium alloy bar having an initial length to 350-420° C. and keeping the temperature for 20 minutes;
    step 2, forging and forming the bar in a multistep process by a forging press to form a wheel hub forging stock having a thickness; and
    Step 3, machining the hub forging stock to make the magnesium alloy wheel hub,
    wherein the step 2 comprises the following sub-steps:
    pressing the bar down from the initial length to ⅔ of the initial length at a down-pressing speed of 12-15 mm/s;
    pressing the bar down from ⅔ of the initial length to ⅓ of the initial length at a down-pressing speed of 9-13 mm/s; and
    pressing the bar down from ⅓ of the initial length to the thickness of wheel hub forging stock at a down-pressing speed of 6-10 mm/s.

2. The forging process of a magnesium alloy wheel hub according to claim 1, wherein the forging press comprises a 6000-ton forging press.

3. The forging process of the magnesium alloy wheel hub according to claim 1, wherein the heating temperature in step 1 is 360° C.

* * * * *